United States Patent [19]
Tamura et al.

[11] 4,417,795
[45] Nov. 29, 1983

[54] AUTOMATIC FOCUS DETECTION DEVICE

[75] Inventors: Shuichi Tamura, Yokohama; Toyotosi Suzuki; Hideo Tamamura, both of Tokyo; Mutsuhide Matsuda, Yokohama, all of Japan

[73] Assignee: Canon Kabushiki Kaisha, Tokyo, Japan

[21] Appl. No.: 364,882

[22] Filed: Apr. 2, 1982

Related U.S. Application Data

[63] Continuation of Ser. No. 191,429, Sep. 29, 1980, abandoned.

[30] Foreign Application Priority Data

Oct. 8, 1979 [JP] Japan ............................. 54-129645

[51] Int. Cl.³ .............................................. G03B 3/10
[52] U.S. Cl. .................................................... 354/25
[58] Field of Search ......................... 354/25 R, 25 A

[56] References Cited

U.S. PATENT DOCUMENTS

| 3,274,914 | 9/1966 | Biedermann et al. | 354/25 |
| 3,435,741 | 4/1969 | Stimson | 354/25 A |
| 3,442,193 | 5/1969 | Pagel | 354/25 A |
| 4,032,934 | 6/1977 | Hendrickson et al. | 354/25 A |
| 4,123,650 | 10/1978 | Hosoe et al. | 354/25 A |

Primary Examiner—Russell E. Adams
Attorney, Agent, or Firm—Toren, McGeady and Stanger

[57] ABSTRACT

In the disclosed automatic focus detection device, two image forming lenses have optical axes fixedly spaced a predetermined distance. Distance measuring elements are arranged near the focal points behind each image forming lens. A holding member holding one of the distance measuring elements is rotated around a shaft outside of the space between the optical axes of the two lenses so as to alter the distance between the distance measuring element and the image forming lens. According to an embodiment, one of the measuring elements is a light source which scans the object through one of the lenses when the holding member is rotated. Rotation of the holding member refocuses the light source throughout its scan.

16 Claims, 2 Drawing Figures

AUTOMATIC FOCUS DETECTION DEVICE

This is a continuation of application Ser. No. 191,429 filed Sept. 29, 1980, now abandoned

BACKGROUND OF THE INVENTION

1. Field of the Invention

The present invention relates to focus detection devices, and particularly, to an automatic focus detection device using a base line distance measuring system.

2. Description of the Prior Art

Various kinds of automatic focus detection devices of the so-called active type, using a light measuring light source and a light projection lens, have been proposed. These scan an object with a light beam from the light source and detect a focus condition by means of a signal from a light sensing element when the light, reflected by the object and passing through the light receiving lens, forms an image on the light sensing element.

To scan with this kind of device, both the light projection image forming lens and the light source lens are rotated, only the lens is moved, or only the light source is moved.

In such devices, when the positions of the image forming lens and the light source are adjusted so that the image is formed correctly on an object at one distance, the image of the light source is not formed correctly on other objects spaced from the first object, and hence, is not sharp. Consequently, when the light beam is reflected and sensed by the light sensing element, it is not possible to detect the peak value correctly. This adversely affects the accuracy of the distance measurement. In order to overcome this disadvantage, U.S. Pat. No. 3,435,744 discloses varying the distance between the lens, the light source, and the light sensing element in cooperation with the focus detection device. Although this type of device can produce a sharp image on the object, and the light sensing element so as to improve the accuracy of the distance measurement, the construction is complicated. Therefore, manufacturing costs are unavoidably high.

SUMMARY OF THE INVENTION

The object of the present invention is to offer an automatic focus detection device free from the above shortcoming, high in accuracy and simple in construction.

In this connection, in case of the present invention, the distance measuring element at least for the one light path is provided on a rotatable member, which is pivoted outside of the domain or space between the principal axis of the both light paths in such a manner that the distance between the distance measuring element and the image forming lens is varied along with the rotation of the member.

BRIEF DESCRIPTION OF THE DRAWINGS

The present invention will be explained in accordance with the accompanying drawings.

DESCRIPTION OF PREFERRED EMBODIMENT

Figure 1:
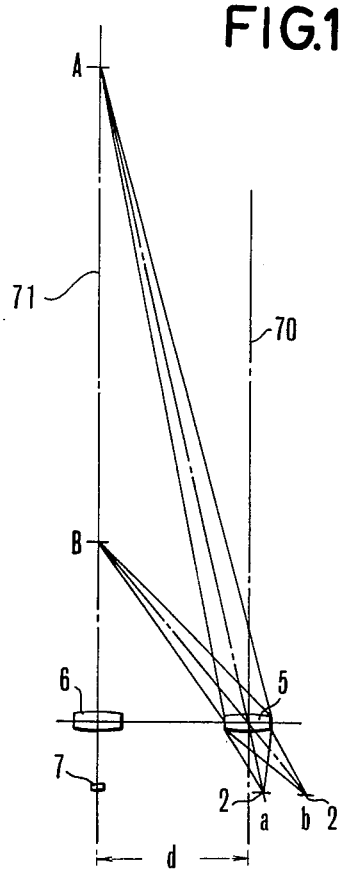
FIG. 1 shows the principle of the present invention.

FIG. 1 shows a light projection image forming lens 5, a light receiving image forming lens 6, a light source 2, a light sensing element 7, the principal axis 70 of the projection light path, and the principal axis 71 of the light receiving path, spaced from the axis 70 by a base line distance d.

In case the object is at far distance, for example, at the position A, the projection light path crosses the light receiving path 71 at the object when the light source 2 is moved to the position a. The light reflected by the object passes through the lens 6 and forms an image on the light sensing element 7 so as to detect the focussed state. If the object is close, for example, at the position B, the both paths cross each other on the object when the light source 2 is moved to b, where it is confirmed that the object is in focus.

Figure 2:
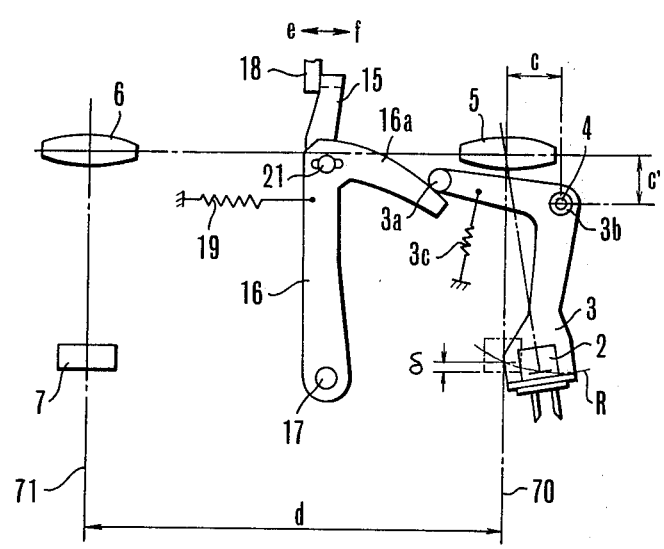
FIG. 2 shows an embodiment of the present invention in plane view.

FIG. 2 shows an embodiment of the automatic focus detection device in accordance with the present invention. Here, the members having the same figures as those in FIG. 1 are the same members. In the drawing, a near infrared ray emitting diode 2 serves as a light source and a lever 3 serves for holding the light source 2. The lever 3 is secured on the sleeve 3b provided on the fixed shaft 4 so as to be rotatable around the shaft 4. The shaft 4 is provided at the position behind the light projection lens 5 by a distance c' and distant from the optical axis of the lens 5 by a distance c along the direction away from the optical axis 71. A pin 18 in the not shown focus adjusting device of the camera is moveable in the directions of the arrows e-f along with the focus adjusting. A lever 15 rotatable around the shaft 17 is normally urged by means of the spring 19 so as to be engaged with the pin 18 with its end. A cam lever 16 rotatable around the shaft 17 is connected to the lever 15 by means of a screw 21, so a pin 3a provided at the one arm of the holding lever 3 normally engages the cam arm 16a, urged by a comparatively weak spring 3c.

In FIG. 2, the not shown focus detection device remains at the end position at the side of the near distance, while the light source 2 assumes the position shown in the solid line. When the focus detection device moves toward the far distance out of the above state, the above pin 18 moves along the direction of the arrow f, whereby the lever 15 engaged with the pin 18 is rotated around the shaft 17 against the strength of the spring 19 along the clockwise direction.

Along with the above movement, the holding lever 3 engaged with the cam arm 16a through the pin 3a is rotated around the shaft 4 against the strength of the spring 3c along the clockwise direction, whereby the light emitting plane of the light source 2 moves along the arc R in such a manner that when the object at is in focus the center of the light emitting plane coincides with the optical axis 70.

At this time, the light source 2 approaches the light projection lens 5 by the distance out of the initial position so as to assume the focal position of the lens 5.

By properly choosing the position of the shaft 4 not so as to distant the light path of the light projection lens 5, the light emitting plane assumes an almost conjugate position with the object at every distance with reference to the lens 5 in such a manner that the image of the light source is normally formed sharply on the object.

In case the light source moves as mentioned above, there is a danger that a play should exist between the shaft and the lever or the shaft should be declined so that the image of the light source should not coincide with the optical axis of the light receiving lens, while in accordance with the present invention, it is possible to arrange the shaft at a position at which the projected light beam could not be disturbed so that the above mentioned problem can be solved by fixing the sleeve in the lever 3 and prolonging the engaging length with the shaft 4.

Although the above embodiment relates only to the automatic focus detection device of the active type, even in case of the automatic focus detection device of the passive type the same effect can be obtained when instead of the light source 2 the light sensing element is held by the lever 3.

Further in case of the automatic focus detection device of the type in accordance with which not the one light path but the two light paths move in accordance with the distance, it is more effective when the distance measuring elements such as the light source, the light sensing element and so on are moved as mentioned above.

What is claimed is:

1. An automatic focus detecting device comprising:
   two image forming lenses having optical axes fixedly spaced a predetermined distance and forming respective focal points;
   distance measuring elements, each arranged in the neighborhood of the focal point behind each image forming lens;
   a holding member for holding one of the distance measuring elements;
   a shaft outside of the space between the optical axes of the two lenses, said holding member being rotatable around the shaft so as to alter the distance between the distance measuring element and the image forming lens, said distance measuring element held by said holding member being spaced radially from said shaft.

2. An automatic focus detection device comprising:
   a light projection image forming lens and a light receiving image forming lens having respective axes fixedly spaced a predetermined distance;
   a light sensing element behind the light receiving image forming lens;
   a light source behind the light projection image forming lens; and
   a holding member for holding the light source;
   a shaft outside the space between the optical axes of the two image forming lenses, said distance measuring element held by said holding member being spaced radially from said shaft, said holding member being rotatable around the shaft to have the source scan the object by means of the light beam from the light source so that the distance between the light source and the light projection image forming lens is varied by rotation of the holding member such that the light source assumes a position, with reference to the light projection image forming lens almost conjugate with the cross point of the light beam with the optical axis of the light receiving image forming lens.

3. An automatic focus detection device in accordance with claim 2, wherein the holding member engages a focus adjusting device and rotates with the focus adjusting device.

4. A device as in claims 1 or 2, wherein the shaft is located between an element and a lens outside the space between the axes.

5. A device as in claims 1 or 2, wherein the shaft is located between an element and a lens outside of the space between the axes, and said holder is movable by a lever extending from between the lens axis across a line joining the lenses.

6. A device as in claims 1, 2, or 3, wherein said shaft is spaced from the one measuring element and from the axis from one of the lenses a distance sufficient for one of the lenses to focus the one measuring element substantially along points of intersection of light through the lenses to or from the one measuring element.

7. A device as in claim 4, wherein said shaft is spaced from the one measuring element and from the axis from one of the lenses a distance sufficient for one of the lenses to focus the one measuring element substantially along points of intersection of light through the lenses to or from the one measuring element.

8. A device as in claim 5, wherein said shaft is spaced from the one measuring element and from the axis from one of the lenses a distance sufficient for one of the lenses to focus the one measuring element substantially along points of intersection of light through the lenses to or from the one measuring element.

9. An automatic focus detection device comprising:
   two image forming lenses having optical axes fixedly spaced a predetermined distance and forming respective focal points;
   distance measuring elements, each arranged in the neighborhood of the focal point behind each image forming lens;
   distance varying means for varying the distance between one of the lenses and one of said measuring elements;
   said distance varying means including a holding member for holding one of the distance measuring elements;
   said distance varying means further including a shaft outside of the space between the optical axes of the two lenses, said holding member being rotatable around the shaft so as to alter the distance between the one distance measuring element and the one image forming lens, said distance measuring element held by said holding member being spaced radially from said shaft to vary the position of the one of the elements relative to the axis of the one of the lenses.

10. An automatic focus detection device comprising:
    a light projection image forming lens and a light receiving image forming lens having respective axes fixedly spaced a predetermined distance;
    a light sensing element behind the light receiving image forming lens;
    a light source element behind the light projection image forming lens; and
    distance varying means for varying the distance between one of the lenses and one of said elements;
    said distance varying means including a holding member for holding the one of the elements;
    said distance varying means further including a shaft outside the space between the optical axes of the two image forming lenses, said first element held by said holding member being spaced radially from said shaft, said holding member being rotatable around the shaft to vary the distance between the one of the elements and the one of the image forming lenses and the distance between the one of the elements and the axis of the one of the lenses so that the one of the elements assumes a position, with reference to the one of the lenses, substantially conjugate with the cross point of the light beam with the optical axis of the light receiving image forming lens.

11. A device as in claims 9 or 10, wherein the shaft is located between an element and a lens outside the space between the axes.

12. A device as in claims 9 or 10, wherein the shaft is located between an element and a lens outside of the space between the axes, and said holder is movable by a lever extending from between the lens axis across a line joining the lenses.

13. A device as in claims 9 or 10, wherein said shaft is spaced from the one measuring element and from the axis from one of the lenses a distance sufficient for one of the lenses to focus the one measuring element substantially along points of intersection of light through the lenses to or from the one measuring element.

14. An automatic focus detecting device, comprising:
two fixedly spaced image forming lenses having respective optical axes and forming respective focal points,
first and second distance measuring means each having an element in the path of light through one of said lenses,
a holding member for holding the one of the elements in the path of light through one of the lenses,
pivoting means forming a pivot axis outside the space between the optical axes for pivoting the holding member, said one of the elements being located in a finite radial distance from the one of the elements so as to change the distance between the one of the elements and the first lens.

15. An automatic focus detecting device comprising:
two image forming lenses having optical axes fixedly spaced a predetermined distance and forming respective focal points,
distance measuring elements, each arranged in the neighborhood of the focal point behind each image forming lens,
a holding member for holding one of the distance measuring elements,
one of said distance measuring elements and one of said lenses forming an optical path with a crossover across the optical axis of the other said lenses,
scanning means for scanning over a range with the one of the elements and the one of the lenses so the crossover between the path and the optical axis of the other of said lenses varies from infinity to close up while maintaining the one of the elements and the crossover substantially conjugate relative to the lens over the scanning range,
said scanning means including a shaft outside of the space between the optical axes of the two lenses, said holding member being rotatable around the shaft so as to alter the distance between the distance measuring element held by said holding member being spaced radially from said shaft.

16. An automatic focus detecting device, comprising:
two fixedly spaced image forming lenses having respective optical axes and forming respective focal points,
first and second distance measuring means each having an element in the path through one of said lenses,
a holding member for holding the one of the elements in the path of light through one of the lenses,
the one of said distance measuring elements and the one of said lenses forming an optical path with a crossover across the optical axis of the other of said lenses,
scanning means for scanning over a range with the of the elements and the one of the lenses so the crossover between the path and the optical axis of the other of said lenses varies from infinity to close up while maintaining the one of the elements and the crossover substantially conjugate relative to the lens over the scanning range,
said scanning means including pivoting means forming a pivot axis outside the space between the optical axes for pivoting the holding member, said one of the elements being located a finite radial distance from the one of the elements so as to change the distance between the one of the elements and the first lens.

* * * * *